United States Patent
Hara et al.

(10) Patent No.: US 7,859,798 B2
(45) Date of Patent: Dec. 28, 2010

(54) MAGNETIC THIN FILM HAVING NON-MAGNETIC SPACER LAYER THAT IS PROVIDED WITH SNO₂ LAYER

(75) Inventors: Shinji Hara, Tokyo (JP); Yoshihiro Tsuchiya, Tokyo (JP); Tomohito Mizuno, Tokyo (JP)

(73) Assignee: TDK Corporation, Tokyo (JP)

( * ) Notice: Subject to any disclaimer, the term of this patent is extended or adjusted under 35 U.S.C. 154(b) by 967 days.

(21) Appl. No.: 11/676,969

(22) Filed: Feb. 20, 2007

(65) Prior Publication Data

US 2008/0198513 A1 Aug. 21, 2008

(51) Int. Cl.
G11B 5/39 (2006.01)
(52) U.S. Cl. .................................. 360/324.1
(58) Field of Classification Search ............. 360/324.1, 360/324.11, 324.12, 324.2
See application file for complete search history.

(56) References Cited

U.S. PATENT DOCUMENTS

| | | | | |
|---|---|---|---|---|
| 7,672,085 | B2* | 3/2010 | Hara et al. ................. | 360/324 |
| 2006/0209472 | A1* | 9/2006 | Koui et al. ............... | 360/324.1 |
| 2008/0170337 | A1* | 7/2008 | Hirata et al. ............ | 360/324.2 |
| 2008/0246023 | A1* | 10/2008 | Zeng et al. ............... | 257/25 |
| 2009/0273972 | A1* | 11/2009 | Han et al. ................. | 365/173 |
| 2010/0103563 | A1* | 4/2010 | Machita et al. ............ | 360/316 |

FOREIGN PATENT DOCUMENTS

| JP | 2003-008102 | 1/2003 |
|---|---|---|
| JP | 2003-298143 | 10/2003 |
| JP | 2005-116791 A | 4/2005 |
| JP | 2006-261306 | 9/2006 |

OTHER PUBLICATIONS

Office Action issued by the Japanese Patent Office on Sep. 21, 2010 for the Japanese counterpart patent application No. 2008-001197.

* cited by examiner

*Primary Examiner*—Jefferson Evans
(74) *Attorney, Agent, or Firm*—Knobbe Martens Olson & Bear LLP

(57) ABSTRACT

A magnetic thin film has: a pinned layer whose magnetization direction is fixed with respect to an external magnetic field; a free layer whose magnetization direction is changed in accordance with the external magnetic field; and a non-magnetic spacer layer that is sandwiched between said the pinned layer and the free layer, wherein sense current is configured to flow in a direction that is perpendicular to film surfaces of the pinned layer, the non-magnetic spacer layer, and the free layer. The non-magnetic spacer layer has a first layer which includes $SnO_2$, and a pair of second layers which are provided to sandwich the first layer, the second layers being made of a material which exhibits a higher corrosion potential than Sn.

16 Claims, 7 Drawing Sheets

MAGNETIC THIN FILM HAVING NON-MAGNETIC SPACER LAYER THAT IS PROVIDED WITH $SnO_2$ LAYER

BACKGROUND OF THE INVENTION

1. Field of the Invention

The present invention relates to a magnetic thin film that is used for a CPP-GMR (Current Perpendicular to the Plane Giant Magneto Resistance) element (hereinafter called a "CPP element") which constitutes a thin-film magnetic head, and more particularly relates to the structure of a non-magnetic spacer layer.

2. Description of the Related Art

A CPP element is known as one of the magnetic field detecting elements which are used in a thin-film magnetic head. A CPP element has a pinned layer whose magnetization direction is fixed with respect to an external magnetic field, a free layer whose magnetization direction is changed in accordance with the external magnetic field, and a non-magnetic spacer layer that is sandwiched between the pinned layer and free layer (also called a "spacer layer"). In this specification, a stacked structure of layers that are comprised of a pinned layer, a non-magnetic spacer layer, and a free layer is called a "magnetic thin film." A magnetic thin film is a central part of a CPP element for generating changes in magneto resistance by the GMR effect. A magnetic thin film forms a CPP element together with other metal layers. Sense current is configured to flow in a direction that is perpendicular to the film surfaces of the pinned layer, the non-magnetic spacer layer, and the free layer. A CPP element is sandwiched between a pair of shield layers. The shield layers also have the function of electrode layers for supplying sense current. Since the CPP element is physically connected with the shield layers, the CPP element has a high efficiency for heat radiation, and a large capacity for sense current. Further, the CPP element exhibits a larger electric resistance and a larger change in resistance in accordance with a decrease in cross section. Accordingly, the CPP element is more suitable for a narrow track width.

Techniques have been disclosed for improving the MR (Magneto Resistance) ratio of the CPP element. The specification of Japanese Patent No. 3293437 discloses a technique to vary the electric resistance of a non-magnetic spacer layer two-dimensionally in the film surface. The specification of Japanese Patent Laid-down Publication No. 2003-298143 and 2006-261306 discloses a non-magnetic spacer layer that is provided with a region that is made of oxides of Sn, Sb etc. and a region that is made of Cu, Ag etc. so that the electric resistance of the non-magnetic spacer layer is varied two-dimensionally in the film surface. According to these techniques, since most sense current flows through the region of smaller electric resistance, an effect can be achieved that is similar to the effect that would be obtained if the cross-section of the element was actually reduced. However, local migration is more likely to occur because current density is increased in the region of lower electric resistance because of the concentration of sense current in this region. For this reason, the CCP element of this type is disadvantageous in term of reliability.

As another technique for improving the MR ratio of a CPP element, Japanese Patent No. 3565268 discloses a non-magnetic spacer layer for which a semiconductor or half metal is used.

SUMMARY OF THE INVENTION

The object of the present invention is to provide a magnetic thin film which achieves a large MR ratio as well as improved reliability. Another object of the present invention is to provide a magnetic field detecting element, a slider, a hard disk drive and so on in which such a magnetic thin film is used.

According to an embodiment of the present invention, a magnetic thin film comprises: a pinned layer whose magnetization direction is fixed with respect to an external magnetic field; a free layer whose magnetization direction is changed in accordance with the external magnetic field; and a non-magnetic spacer layer that is sandwiched between said pinned layer and said free layer, wherein sense current is configured to flow in a direction that is perpendicular to film surfaces of said pinned layer, said non-magnetic spacer layer, and said free layer. Said non-magnetic spacer layer has a first layer which includes $SnO_2$, and a pair of second layers which are provided to sandwich said first layer, said second layers being made of a material which exhibits a higher corrosion potential than Sn.

According to an embodiment, said first layer consists of $SnO_2$. According to another embodiment, said first layer consists of $SnO_2$ and $Sb_2O_5$. According to yet another embodiment, said first layer consists of $SnO_2$ to which F is added.

A magnetic field detecting element according to the present invention comprises said magnetic thin film mentioned above.

A slider according to the present invention comprises said magnetic field detecting element mentioned above.

A wafer according to the present invention has said magnetic thin film formed thereon.

A head gimbal assembly according to the present invention comprises said slider mentioned above and a suspension for resiliently supporting said slider.

A hard disk drive according to the present invention comprises said slider mentioned above and a device for supporting said slider and for positioning said slider with respect to a recording medium.

The above and other objects, features and advantages of the present invention will become apparent from the following description with reference to the accompanying drawings which illustrate examples of the present invention.

DESCRIPTION OF THE PREFERRED EMBODIMENTS

Figure 1:
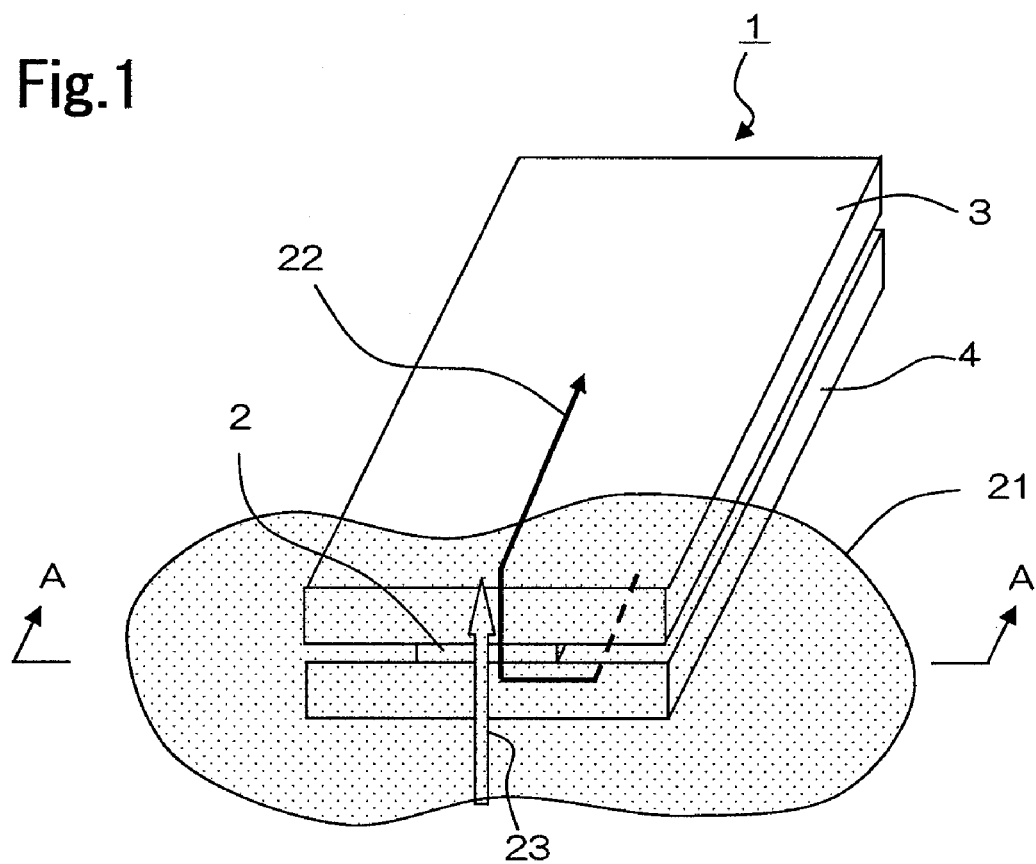
FIG. 1 is a partial perspective view of a thin-film magnetic head.

An embodiment of a CPP element using a magnetic thin film of the present invention will be described with reference to the drawings. While the following embodiment will be described in connection with a thin-film magnetic head for a hard disk drive, the magnetic field detecting element of the present invention may also be applied to a magnetic memory element, a magnetic sensor assembly etc.

Reference Embodiment

First, the inventors made a CPP element having a non-magnetic spacer layer in a three-layer structure of Cu/ZnO/Cu, in which a semiconductor or half metal is used. The CPP element was annealed at 250° C. or higher in order to crystallize the ZnO layer. The thickness of the ZnO layer was chosen from a range between 1.2 and 1.6 nm. It was confirmed that the CPP element, in which ZnO is used as a part of the non-magnetic spacer layer, exhibits a larger MR ratio than a conventional CPP element in which Cu is used alone for the non-magnetic spacer layer. It is generally known that ZnO exhibits n-type semi-conducting characteristics due to the emission of electrons from inter-lattice zinc and oxygen deficiency. The defect is represented by the Kröger-Vink notation which is expressed by Equations (1), (2):

$$ZnO \rightarrow Zn_i^* + e^- + \frac{1}{2}O_2 \quad (1)$$

$$ZnO \rightarrow Zn_{Zn}^* + V_o^* + e^- + \frac{1}{2}O_2 \quad (2)$$

$Zn_{Zn}^*$ Zn which exists at the site of Zn;
$Zn_i^*$ Zn which exists between lattices and which has emitted one valence electron;
$V_O^*$ Oxygen hole which has trapped one positive hole; and
$O_O^*$ O which exists at the site of O.

Equation (1) represents the generation of inter-lattice zinc, and Equation (2) represents the generation of oxygen deficiency. It can be understood from these equations that one free electron is emitted and the number of carriers of an n-type semiconductor is increased. However, there are various theories on the origin of manifestation of n-type characteristics, and the above equations merely represent one model among many.

The non-magnetic spacer layer in a three-layer structure of Cu/ZnO/Cu is able to exhibit a large MR ratio, and is less susceptible to degradation in reliability that may occur due to local migration. However, the following disadvantages still exist. A slider is fabricated by dicing a wafer, on which a plurality of layers that constitute CPP elements are formed, into bars, then lapping the diced surface to form an air bearing surface, and subsequently dicing the bar into sliders. The surface that is lapped is in contact with lapping solvent, and is chemically affected by the solvent. The above-mentioned ZnO does not have sufficient chemical resistance, particularly, to acid. Specifically, the lapped surface may be corroded by the acidic lapping solvent, and part of ZnO may elute. Although this problem does not occur as long as the lapping solvent is neutral, pH of the lapping solvent may actually be changed by the material that is lapped and the lapping solvent may be acidified. A mild alkalescent lapping solvent may be used for this reason. However, variation in pH may cause degraded characteristics and lower yield. Thus, the inventors further developed a magnetic thin film that is less susceptible to degradation in reliability that may occur due to local migration, that exhibits a large MR ratio, and that has large chemical resistance.

First Embodiment

FIG. 1 is a partial perspective view of a thin-film magnetic head in which a magnetic thin film of the present invention is used. Thin-film magnetic head 1 may be a read only head, or may be an MR/inductive composite head which additionally has a write head portion. Magnetic field detecting element 2 is a CPP element. Magnetic field detecting element 2 is sandwiched between upper electrode/shield 3 and lower electrode/shield 4, and the leading end thereof is disposed opposite to recording medium 21. Magnetic field detecting element 2 is configured such that sense current 22 flows in a direction that is perpendicular to the film surfaces under a voltage that is applied between upper electrode/shield 3 and lower electrode/shield 4. The magnetic field of recording medium 21 at a position opposite to magnetic field detecting element 2 is changed in accordance with the movement of magnetic medium 21 in moving direction 23. Magnetic field detecting element 2 detects the change in magnetic field as a change in electric resistance based on the GMR effect, and reads magnetic information that is written in each magnetic domain of recording medium 21.

Figure 2:
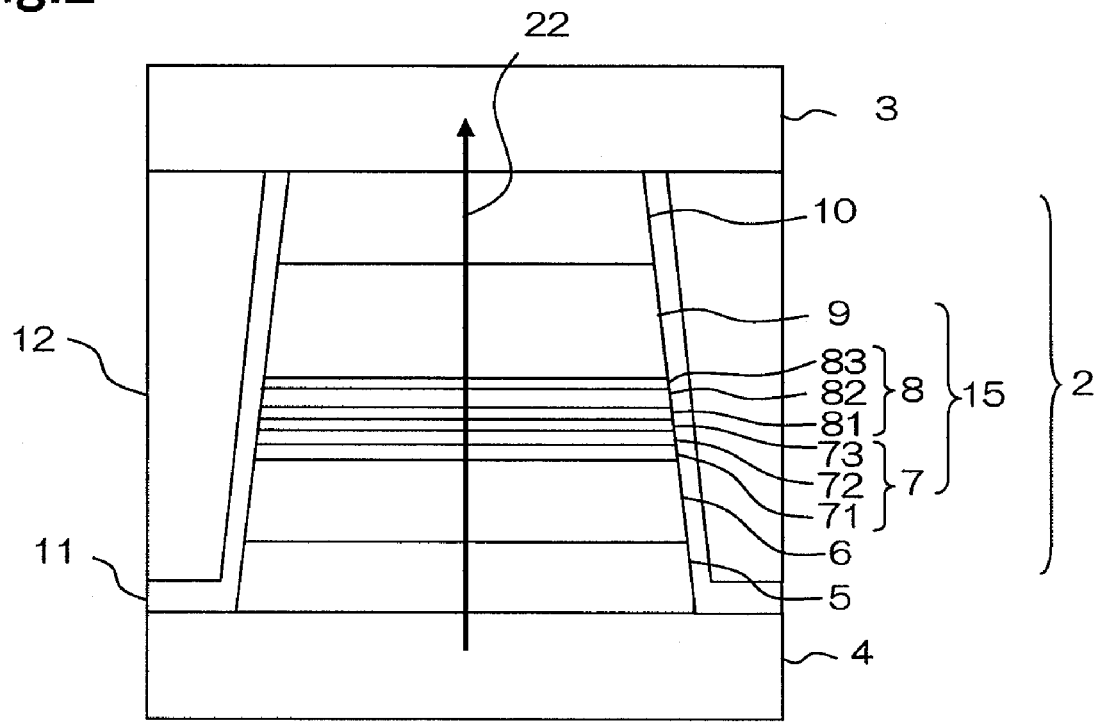
FIG. 2 is a side view of the magnetic field detecting element that is included in the thin-film magnetic head shown in FIG. 1.

FIG. 2 is a side view of the magnetic field detecting element viewed from A-A direction in FIG. 1, i.e., from the air bearing surface. The air bearing surface refers to a surface of thin-film magnetic head 1 which is opposite to recording medium 21. Table 1 shows an exemplary layer configuration of magnetic field detecting element 2. Table 1 shows the layers in the order of stacking from buffer layer 5 at the bottom row, which is in contact with lower electrode/shield 4, to cap layer 10 at the top row, which is in contact with upper electrode/shield 3.

TABLE 1

| Layer Configuration | | Composition | Thickness (nm) |
|---|---|---|---|
| Cap layer 10 | | Ru | 2 |
| Free Layer 9 | | CoFe | 4 |
| Non-magnetic Spacer Layer 8 | Second Layer 83 | Cu | 0.7 |
| | First Layer 82 | SnO$_2$ | 1.4 |
| | Second Layer 81 | Cu | 0.7 |
| Pinned Layer 7 | Inner Pinned Layer 73 | CoFe | 3.5 |
| | Non-magnetic Intermediate Layer 72 | Ru | 0.7 |
| | Outer Pinned Layer 71 | CoFe | 3 |
| Anti-ferromagnetic Layer 6 | | IrMn | 5 |
| Buffer Layer 5 | | NiCr | 4 |

Magnetic field detecting element 2 is a stacked structure in which buffer layer 5, anti-ferromagnetic layer 6, pinned layer 7, non-magnetic spacer layer 8, free layer 9, and cap layer 10 are stacked in this order on lower electrode/shield 4, which is made of a NiFe layer and has a thickness of approximately 1 μm. Pinned layer 7, non-magnetic spacer layer 8, and free layer 9 constitute magnetic thin film 15. Pinned layer 7 is a layer whose magnetization direction is fixed with respect to an external magnetic field. Free layer 9 is a layer whose magnetization direction is changed in accordance with the external magnetic field. Sense current 22 flows in the direction that is perpendicular to the film surfaces of pinned layer 7, non-magnetic spacer layer 8, and free layer 9, i.e., magnetic thin film 15. The magnetization direction of free layer 9 forms an angle relative to the magnetization direction of pinned layer 7 in accordance with the external magnetic field. Spin dependent scattering of conduction electrons is varied in accordance with the relative angle, and change in magneto resistance is caused. Thin-film magnetic head 1 detects the change in magneto resistance so that it reads magnetic information on a recording medium.

Pinned layer 7 is constructed as a so-called synthetic pinned layer. Specifically, pinned layer 7 has outer pinned layer 71, inner pinned layer 73 that is disposed closer to non-magnetic spacer layer 8 than outer pinned layer 71, and non-magnetic intermediate layer 72 that is sandwiched between outer pinned layer 71 and inner pinned layer 73. The magnetization direction of outer pinned layer 71 is fixed due to exchange coupling with anti-ferromagnetic layer 6. Further, inner pinned layer 73 is anti-ferromagnetically coupled to outer pinned layer 71 via non-magnetic intermediate layer 72. Thus, the magnetization direction of inner pinned layer 73 is firmly fixed. In this way, in the synthetic pinned layer, a stable magnetization state is maintained in pinned layer 7, and effective magnetization of pinned layer 7 is limited as a whole.

Non-magnetic spacer layer 8 is a layer in three-layer structure in which first layer 82, which is made of $SnO_2$ (tin oxide), is sandwiched between a pair of second layers 81, 83 which are made of Cu (copper). It is known that $SnO_2$, similarly to ZnO, exhibits n-type semi-conducting characteristics due to the emission of electrons from inter-lattice tin or oxygen deficiency. The defect is represented by the Kröger-Vink notation expressed by Equations (3), (4):

$$SnO_2 \rightarrow Sn_i^* + e^- + O_2 \quad (3)$$

$$SnO_2 \rightarrow Sn_{Sn}^* + V_O^* e^- + O_2 \quad (4)$$

$Sn_{Sn}^*$ Sn which exists at the site of Sn;
$Sn_i^*$ Sn which exists between lattices and which has emitted one valence electron
$V_O^*$ Oxygen hole which has trapped one positive hole; and
$O_O^*$ which exists at the site of O.

Equation (3) represents the generation of inter-lattice tin, and Equation (4) represents the generation of oxygen deficiency. It can be understood from these equations that one free electron is emitted and the number of carriers in an n-type semiconductor is increased. Further, a CPP element in which $SnO_2$ is used as first layer 82 exhibits a MR ratio that is equivalent to or larger than that of a CPP element in which ZnO is used as first layer 82, as will be later described. The inventors think that this is because of the tendency of $SnO_2$ to preserve spin information of conduction electrons.

Figure 3:
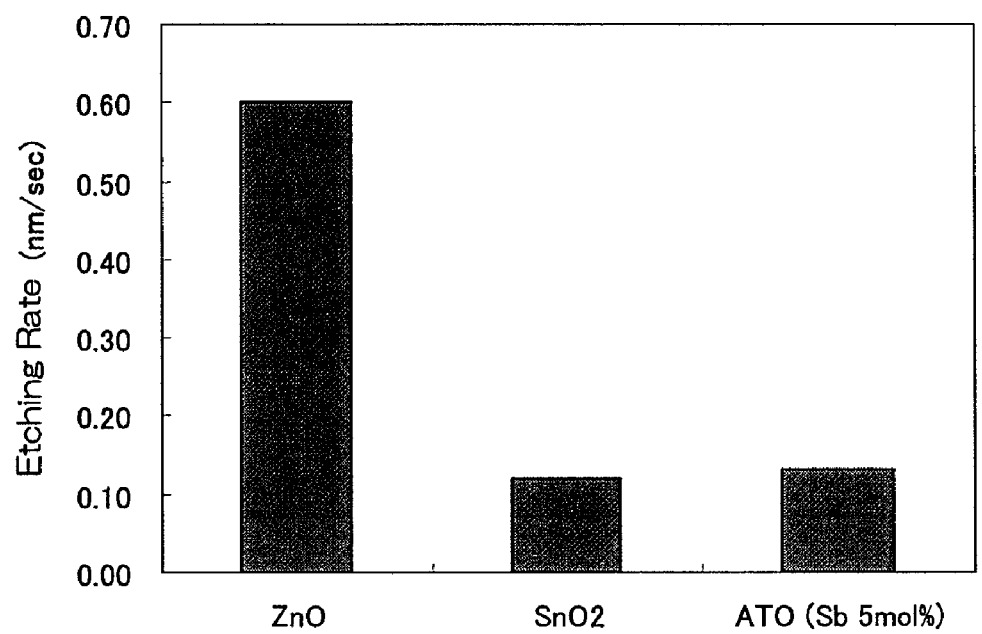
FIG. 3 is a graph of etching rates for ZnO, $SnO_2$, and ATO.

FIG. 3 shows a comparison of etching rates between ZnO and $SnO_2$. The data were collected in the following manner. First, a seed layer (Cu, 5 nm thick) was deposited on a silicon substrate, then a ZnO layer or a $SnO_2$ layer each having a thickness of 50 nm was deposited on the seed layer. Next, resist was formed on the ZnO layer and the $SnO_2$ layer, respectively, and the layers were dipped in oxalic acid (10 wt % concentration) for a predetermined time. After taking the layers out of the oxalic acid, the resist was removed, and recesses were measured to evaluate etching rates. It can be seen from the graph that $SnO_2$, which presents an etching rate that is approximately one fifth of that of ZnO, has excellent chemical resistance. FIG. 3 also shows the etching rate of ATO (Antimony doped Tin Oxide), as will be later described. The etching rate of ATO was measured in the same manner as for ZnO and $SnO_2$.

Second layers 81, 83 are provided to prevent oxygen from being diffused from first layer 82. Oxygen that is contained in $SnO_2$ of first layer 82 tends to be diffused into adjoining pinned layer 7 and free layer 9. This is because Co and Fe, which form pinned layer 7 and free layer 9, have lower corrosion potentials or standard electrode potentials than Sn. If oxygen that is contained in $SnO_2$ is diffused into pinned layer 7 and free layer 9, $SnO_2$ will become more similar to pure Sn and will lose the nature of an oxide and the nature of a semiconductor. As a result, the electric resistance of magnetic thin film 15, as well as the MR ratio, is decreased. Cu effectively prevents the diffusion of oxygen due to higher corrosion potential or higher standard electrode potential as compared with Sn. Accordingly, any materials which have higher corrosion potentials or higher standard electrode potentials than Sn may be used as second layers 81, 83. Second layers 81, 83 may be formed of materials such as Au, Ag, Pt, Pd, Ir, Ru, Rh, Re, instead of Cu.

Buffer layer 5 is provided to ensure sufficient exchange coupling of anti-ferromagnetic layer 6 with outer pinned layer 71. Cap layer 10 is provided to prevent deterioration of each of the stacked layers. Upper electrode/shield 3, which is made of a NiFe film and is approximately 1 μm thick, is formed on cap layer 10.

Hard bias films 12 are formed on the sides of magnetic field detecting element 2 via insulating films 11. Hard bias film 12 is a magnetic domain control film for placing free layer 9 in the state of a single magnetic domain. Insulating film 11 is made of $Al_2O_3$, and hard bias film 12 is made of CoPt, CoCrPt or the like.

The CPP element of the present embodiment is a bottom type in which the pinned layer is deposited prior to the free layer. However, the present invention can similarly be applied to a top type CPP element in which the free layer is deposited prior to the pinned layer. Also, the pinned layer does not have to be a synthetic pinned layer, and a single-layer pinned layer without using anti-ferromagnetic coupling may be used.

The foregoing thin-film magnetic head is manufactured in the following manner. First, lower electrode/shield 4 is formed on a substrate, not shown, that is made of a ceramic material, such as Altic ($Al_2O_3$.TiC), via an insulating layer, not shown. Subsequently, the layers beginning with buffer layer 5 and ending with cap layer 10 are sequentially deposited by means of sputtering. A $SnO_2$ layer is deposited by sputtering using a $SnO_2$ target. After cap layer 10 is deposited, the $SnO_2$ layer is crystallized by annealing at 270° C. for three hours. Subsequently, the annealed layers are patterned into a column shape, then hard bias films 12 are formed on the side surfaces thereof, and the remaining portions are filled with an insulating layer. Subsequently, upper electrode/shield 3 is formed to complete the read head portion of the thin-film magnetic head, as illustrated in FIG. 2. A write magnetic pole layer and a coil are further formed if a write head portion is required. Subsequently, the entire structure is covered with a protection layer. Then, the wafer is diced, lapped, and separated into a stacked structure (slider) in which the thin-film magnetic head is formed.

Second Embodiment

First layer 82 of non-magnetic spacer layer 8 may also be made of $SnO_2$ and $Sb_2O_5$ (antimony oxide). $Sb_2O_5$ is doped into $SnO_2$, and such a composition may be called "ATO." In this specification as well, the above-mentioned composition may be called "ATO." Table 2 shows an exemplary layer configuration of magnetic field detecting element 2 in which ATO is used for first layer 82. Except for first layer 82 being made of ATO, the layer configuration of magnetic field detecting element 2 is similar to that shown in Table 1. Although second layer 82 is made of Cu, it may be formed of materials such as Au, Ag, Pt, Pd, Ir, Ru, Rh, Re, similarly to the first embodiment.

TABLE 2

| Layer Configuration | | Composition | Thickness (nm) |
|---|---|---|---|
| Cap layer 10 | | Ru | 2 |
| Free Layer 9 | | CoFe | 4 |
| Non-magnetic Spacer Layer 8 | Second Layer 83 | Cu | 0.7 |
| | First Layer 82 | $SnO_2$ | 1.4 |
| | Second Layer 81 | Cu | 0.7 |
| Pinned Layer 7 | Inner Pinned Layer 73 | CoFe | 3.5 |
| | Non-magnetic Intermediate Layer 72 | Ru | 0.7 |
| | Outer Pinned Layer 71 | CoFe | 3 |
| Anti-ferromagnetic Layer 6 | | | 5 |
| Buffer Layer 5 | | | 4 |

When $Sb_2O_5$ is doped into $SnO_2$, free electrons are further emitted due to the reaction expressed by Equation (5). As a result, the concentration of carrier is increased and the resistance ratio is reduced. Since the number of free electrons which are emitted is incomparably larger than the number of free electrons that have an origin in the lattice defects of $SnO_2$ itself, the characteristics of ATO can be controlled by the amount of additive $Sb_2O_5$. It is also possible to adjust the resistance of the non-magnetic spacer layer by using this phenomenon.

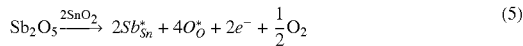

$$Sb_2O_5 \xrightarrow{2SnO_2} 2Sb_{Sn}^* + 4O_O^* + 2e^- + \frac{1}{2}O_2 \qquad (5)$$

Referring to FIG. 3, the etching rate against oxalic acid (10 wt %) is substantially equal to the etching rate of $SnO_2$, and sufficient chemical resistance as compared with ZnO was confirmed.

The CPP element having ATO for first layer 82 allows first layer 82 to have a large thickness, as will be later described. This will contribute to preventing manufacturing defects, such as pinholes in first layer 82 and short-circuits between layers 81, 83.

The method of manufacturing the CPP element of the second embodiment is basically the same as that of manufacturing the CPP element in first embodiment. In order to form an ATO layer, sputtering is performed using an ATO target having an adjusted composition or a $SnO_2$ target with a $Sb_2O_5$ chip adhered thereto. The annealing condition is similar to that in the first embodiment.

Instead of ATO, first layer 82 of non-magnetic spacer layer 8 may be made of a material that is made by doping F (fluorine) into $SnO_2$. Such a composition may be called "FTO" (Fluorine doped Tin Oxide). The layer configuration of magnetic field detecting element 2 is similar to that shown in Table 2 except that first layer 82 is made of ATO. The CPP element in which FTO is used is also capable of achieving both a large MR ratio and sufficient chemical resistance.

Next, appropriate layer configurations were studied for the non-magnetic spacer layer of the CPP element described above, based on experiments. The CPP element was formed by the same method described above in each embodiment.

(Experiment 1)

First, the MR ratio and the AR value were measured for cases in which ZnO, $SnO_2$, and ATO are used as first layer 82 of non-magnetic spacer layer 8. The case in which ZnO was used is a comparative example. In the case in which ATO was used, the amount of additive Sb was 5 mol %. The AR value refers to the product of element area A and element resistance R. Since a large AR value may cause an increase in element resistance due to shot noise, the AR value is preferably equal to or smaller than 0.3 ($\Omega l/\mu m^2$). Since a small AR value may cause an increase in spin torque which may affect the response of the free layer, the AR value is preferably equal to or larger than 0.1 ($\Omega l/\mu m^2$). In conclusion, a proper range of the AR value is equal to or larger than 0.1 ($\Omega l/\mu m^2$) and equal to or smaller than 0.3 ($\Omega /\mu m^2$). In particular, the AR value is preferably equal to or larger than 0.15 ($\Omega /\mu m^2$) and equal to or smaller than 0.2 ($\Omega /\mu m^2$). The thickness of first layer 82 was changed from 0.4 nm to 4.0 nm in increments of 0.4 nm. The layer configuration is shown in Table 3.

TABLE 3

| Layer Configuration | | Composition | Thickness (nm) |
|---|---|---|---|
| Cap layer 10 | | Ru | 2 |
| Free Layer 9 | | CoFe | 4 |
| Non-magnetic Spacer Layer 8 | Second Layer 83 | Cu | 0.7 |
| | First Layer 82 | ZnO, $SnO_2$, ATO | 0.8~4.0 (increment 0.4) |
| | Second Layer 81 | Cu | 0.7 |
| Pinned Layer 7 | Inner Pinned Layer 73 | CoFe | 3.5 |
| | Non-magnetic Intermediate Layer 72 | Ru | 0.7 |
| | Outer Pinned Layer 71 | CoFe | 3 |
| Anti-ferromagnetic Layer 6 | | IrMn | 5 |
| Buffer Layer 5 | | NiCr | 4 |

Figure 4A:
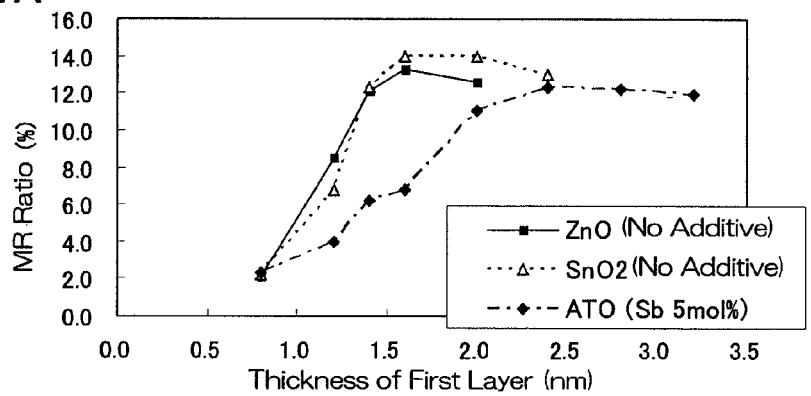
FIG. 4A is a graph showing the relationship between the thickness of the first layer and the MR ratio.
Figure 4B:
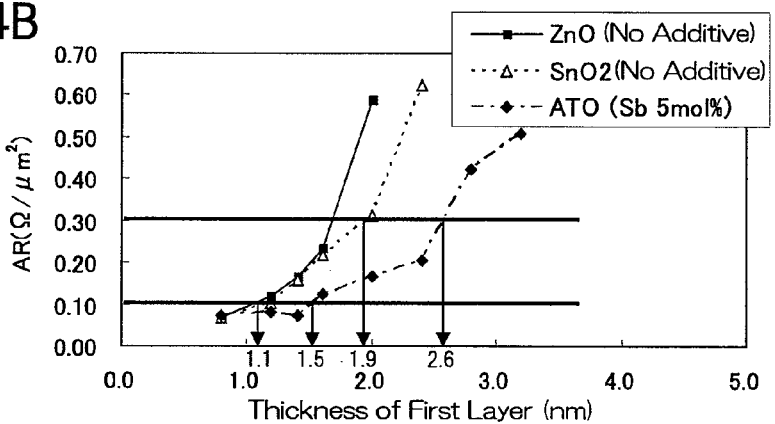
FIGS. 4B, 4C are graphs each showing the relationship between the thickness of the first layer and the AR value.
Figure 4C:
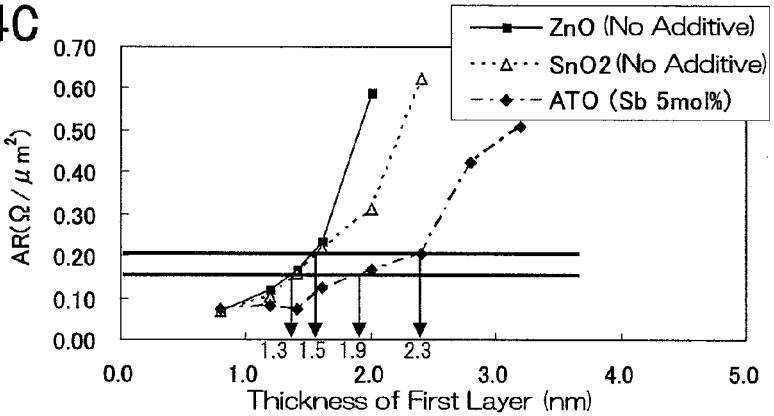
Figure 4D:
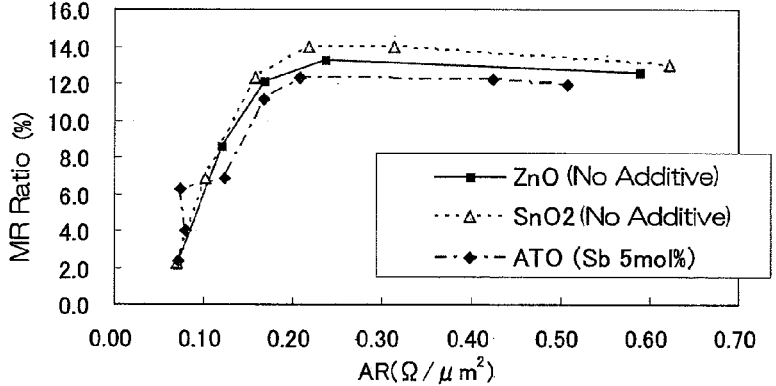
FIG. 4D is a graph showing the relationship between the AR value and the MR ratio.

FIGS. 4A-4D show the results. FIGS. 4B and 4C are identical except for the proper range of the AR value. Referring first to FIG. 4A, the MR ratio is substantially the same for the case in which $SnO_2$ was used as first layer 82 and for the case in which ZnO was used as first layer 82. However, a larger MR ratio is achieved for the case in which $SnO_2$ is used as first layer 82 in the range in which the first layer has a relatively large thickness. In particular, a MR ratio as large as approximately 14 was achieved in the thickness range between 1.5 and 2.0 nm. Referring to FIGS. 4B, 4C, the AR value presents a generally similar tendency for the case in which ZnO was used as first layer 82 and for the case in which $SnO_2$ was used, although the range of allowable thickness for first layer 82 slightly expands as compared with the case in which ZnO was used as first layer 82. In other words, $SnO_2$ has equivalent or better characteristics as the material for the non-magnetic spacer layer of the magnetic thin film, as compared with ZnO.

The MR ratio for the case in which ATO was used is smaller than the MR ratio for the case in which ZnO was used as first layer 82 when compared at the same thickness. On the other hand, the thickness of the first layer that corresponds to the proper range of the AR value is shifted to larger values, as compared with the case in which ZnO was used. This is because ATO has a large electric conductivity. However, referring to FIG. 4D, it will be understood that the MR ratio for the case in which ATO was used as first layer 82 is substantially same as the MR ratio for the case in which ZnO or SnO$_2$ was used as first layer 82, when compared in the proper range of the AR value.

If first layer 82 has a small thickness, then pin holes are more likely to occur due to variations in thickness during deposition. This may result in degradation in the reliability-related characteristics due to electromigration, which is observed in a magnetic thin film of a type in which electric resistance of non-magnetic spacer layer 8 is varied two-dimensionally in the film surface. Also, a short-circuit may occur between the second layers during lapping, which will cause noise and deterioration in the MR ratio. For these reasons, wide discretion for setting the thickness of the first film provides significant advantages, resulting in wide discretion for head design.

The proper range of the thickness of the first layer can be determined from the proper range of the AR value. When SnO$_2$ is used as first layer 82, the thickness of 1.1 to 1.9 nm corresponds to the proper range of the AR value which is equal to or larger than 0.1 and equal to or smaller than 0.3. The thickness of 1.3 to 1.5 nm corresponds to the proper range of the AR value which is equal to or larger than 0.15 and equal to or smaller than 0.2. When ATO is used as first layer 82, the thickness of 1.5 to 2.6 nm corresponds to the proper range of the AR value which is equal to or larger than 0.1 and equal to or smaller than 0.3. The thickness of 1.9 to 2.3 nm corresponds to the proper range of the AR value which is equal to or larger than 0.15 and equal to or smaller than 0.2. A sufficient MR ratio is achieved for any of these thickness ranges.

(Experiment 2)

Figure 5:
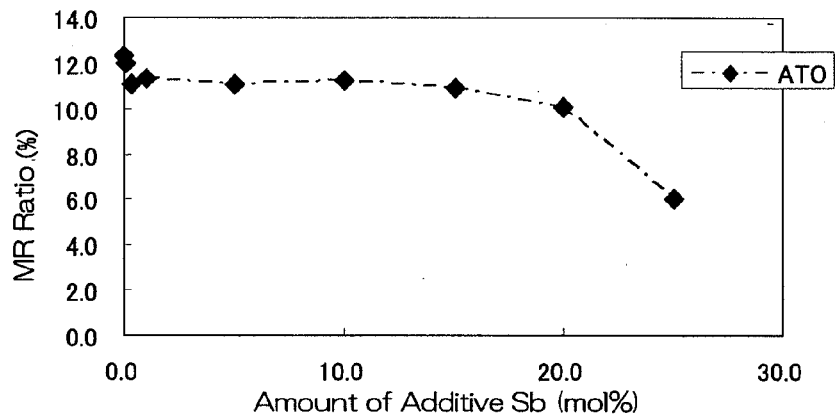
FIG. 5 is a graph showing the relationship between the amount of additive Sb and the MR ratio.

Next, using the amount of additive Sb as a parameter, the MR ratio was measured for the case in which ATO was used. The layer composition was similar to that shown in Table 3, and the thickness of the first layer was chosen to be 1.4 nm. The amount of additive Sb was chosen to be 0.1, 0.3, 1, 5, 10, 15, 20, 25 mol %. Referring to FIG. 5, although the influence of the amount of additive Sb on the MR ratio is limited, the MR ratio tends to be reduced when the amount exceeds 20 mol %. Accordingly, the amount of additive Sb is preferably more than 0 mol % and equal to or less than 20% mol.

(Experiment 3)

Figure 6:
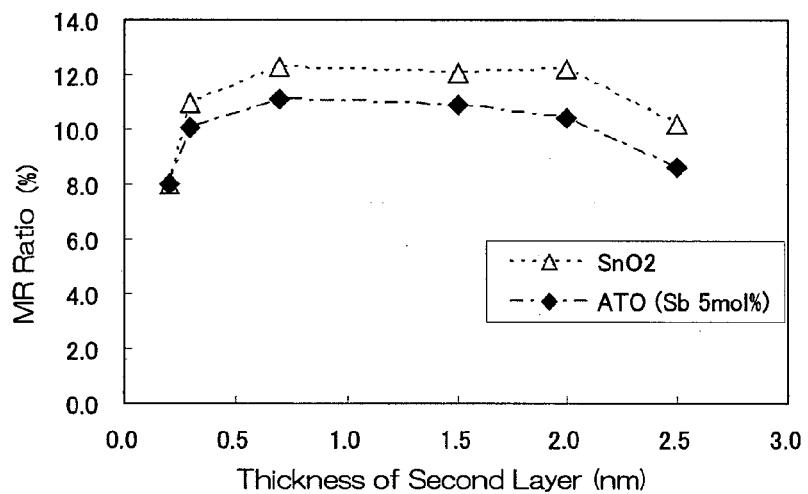
FIG. 6 is a graph showing the relationship between the thickness of the second layer and the MR ratio.

Next, studies were made on the influence of the thickness of the second layer on the MR ratio. In the case in which SnO$_2$ was used as first layer 82, the thickness of the first layer was chosen to be 1.4 nm, and Cu was used for the second layer. In the case in which ATO was used as first layer 82, the thickness of the first layer was chosen to be 2.0 nm, and Cu was used for the second layer. In each case, the thickness of the second layer was chosen to be 0.2, 0.3, 0.7, 1.5, 2.0, 2.5 nm. Referring to FIG. 6, the MR ratio is sharply decreased when the thickness of Cu is small. This is probably because the function of Cu to prevent oxygen diffusion is degraded. The MR ratio is gradually decreased when the thickness of Cu is large. This is probably because information encoded in the spin state of conduction electrons is gradually lost in accordance with an increase in the thickness of the Cu layer. The range of desired thickness of the second layer for achieving a MR ratio of approximately 10 is 0.3-2.5 nm when SnO$_2$ was used as first layer 82, and is 0.3-2.0 nm when ATO was used as first layer 82.

(Experiment 4)

Finally, chemical resistance of the element was investigated using ZnO, SnO$_2$ and ATO as first layer 82 of non-magnetic spacer layer 8. The layer composition of the CPP element was the same as shown in FIG. 3. The thickness of the layer was chosen to be 1.4 nm in the case of the ZnO layer, 1.4 nm in the case of the SnO$_2$ layer, and 2.0 nm in the case of the ATO layer. CPP elements were formed in accordance with the manufacturing method described in the embodiment, and the air bearing surface was lapped while the elements were in the state of a bar. Although neutral slurry was used for lapping, it is thought that pH was gradually changed under the influence of the material that was lapped. After lapping, a DLC (Diamond like Carbon) layer was formed on the lapped surface. One hundred elements were manufactured for each case, and the resistance of the elements was measured.

If an element has large chemical resistance, then the first layer is less susceptible to corrosion and elusion even if the pH of the slurry is changed with the progression of lapping. Specifically, the elements have small variations in resistance because of the low etching rate against acid (oxalic acid). On the other hand, if elements have small chemical resistance, then the first layer is susceptible to corrosion and elusion, and this results in large variations in resistance. Therefore, it is possible to perform relative evaluation of the degree of chemical resistance of the elements by measuring variation in resistance of the elements.

Figure 7:
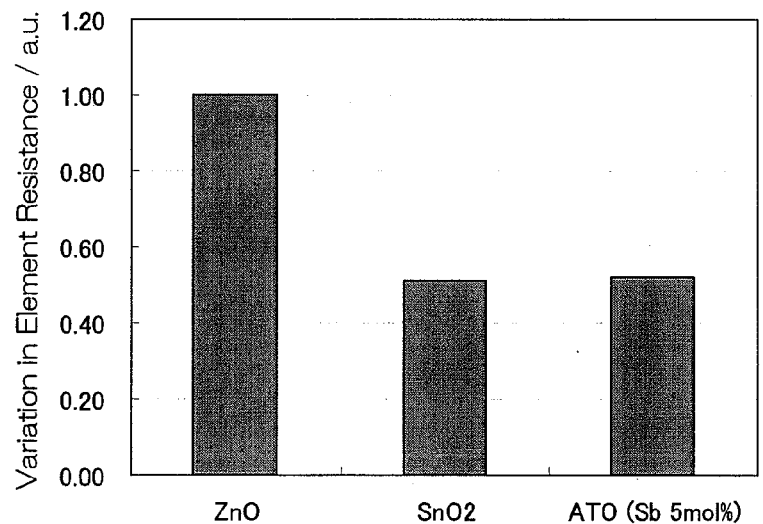
FIG. 7 is a graph showing variation in element resistance when ZnO, $SnO_2$, and ATO are used for the first layer.

FIG. 7 shows variation (standard deviation) in element resistance of the elements that was measured in this way. In FIG. 7, the variation is normalized such that the variation in the case in which ZnO was used as first layer 82 is equal to 1. The variation in element resistance is the smallest when SnO$_2$ was used as first layer 82, and is substantially the same when ATO was used. On the other hand, considerably large variation was found when ZnO was used as first layer 82. This result is consistent with the etching rate of each material shown in FIG. 3. The magneto resistance element in which SnO$_2$ or ATO is used as first layer 82 of non-magnetic spacer layer 8 is resistive against change in characteristics during manufacture, and is quite excellent from an industrial viewpoint.

Figure 8:
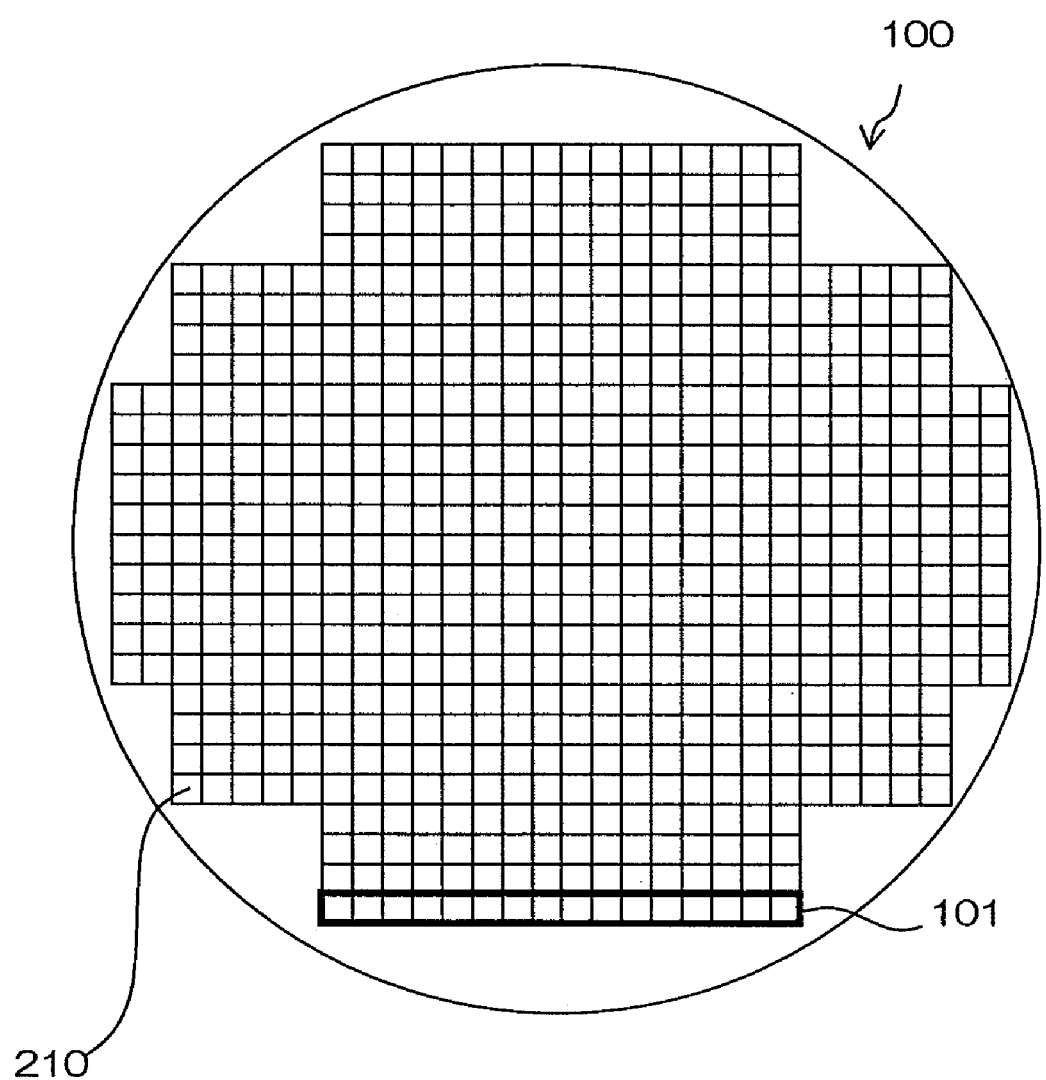
FIG. 8 is a plan view of a wafer which is used to manufacture a magnetic field detecting element of the present invention.

Next, explanation will be made regarding a wafer for fabricating a thin-film magnetic head described above. FIG. 8 is a schematic plan view of a wafer. Wafer 100 has layers which are deposited thereon to form at least the magnetic field detecting element. Wafer 100 is diced into bars 101 which serve as working units in the process of forming air bearing surface ABS. After lapping, bar 101 is diced into sliders 210 which include thin-film magnetic heads 1. Dicing portions, not shown, are provided in wafer 100 in order to dice wafer 100 into bars 101 and into sliders 210.

Figure 9:
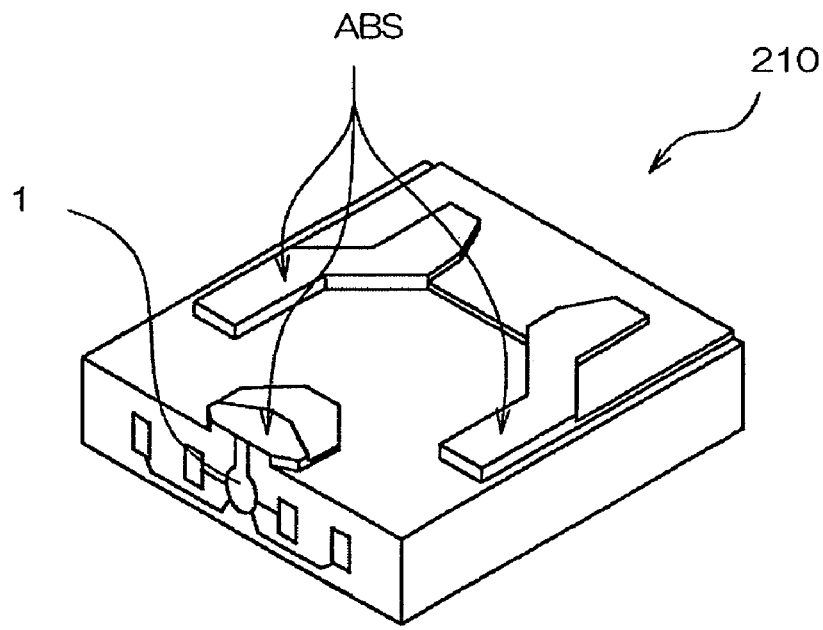
FIG. 9 is a perspective view of a slider of the present invention.
Figure 9:
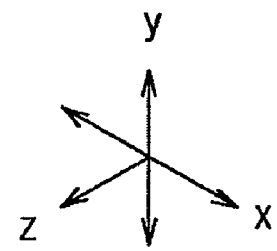

Referring to FIG. 9, slider 210 has a substantially hexahedral shape. One of the six surfaces of slider 210 forms air bearing surface ABS, which is positioned opposite to the hard disk.

Figure 10:
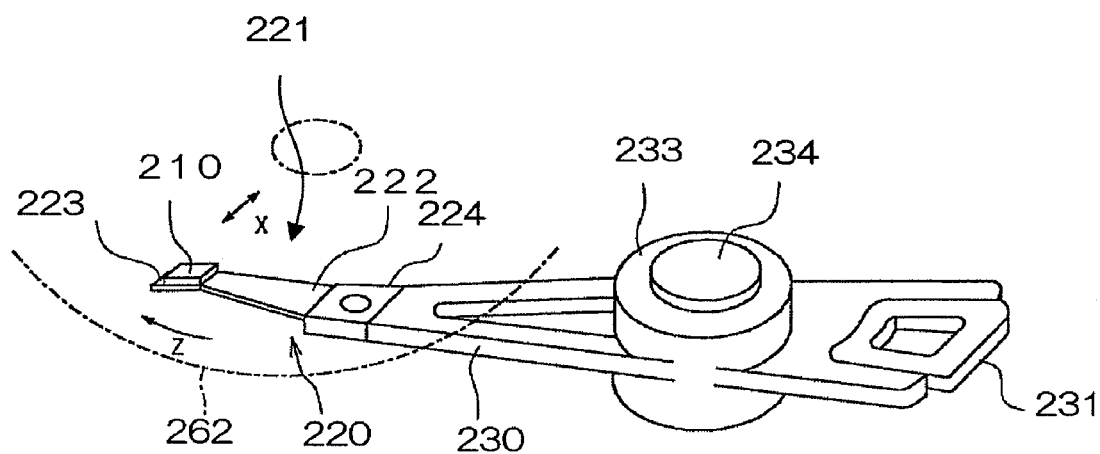
FIG. 10 is a perspective view of a head arm assembly which includes a head gimbal assembly which incorporates a slider of the present invention.

Referring to FIG. 10, head gimbal assembly 220 has slider 210 and suspension 221 for resiliently supporting slider 210. Suspension 221 has load beam 222 in the shape of a flat spring and made of, for example, stainless steel, flexure 223 that is attached to one end of load beam 222, and base plate 224 provided on the other end of load beam 222. Slider 210 is fixed to flexure 223 to provide slider 210 with an appropriate degree of freedom. The portion of flexure 223 to which slider 210 is attached has a gimbal section for maintaining slider 210 in a fixed orientation.

Slider 210 is arranged opposite to a hard disk, which is a rotationally-driven disc-shaped storage medium, in a hard disk drive. When the hard disk rotates in the z direction shown in FIG. 10, airflow which passes between the hard disk and slider 210 creates a dynamic lift, which is applied to slider 210 downward in the y direction. Slider 210 is configured to lift up from the surface of the hard disk due to this dynamic lift effect. Thin-film magnetic head 1 is formed in proximity to the trailing edge (the end portion at the lower left in FIG. 9) of slider 210, which is on the outlet side of the airflow.

The arrangement in which a head gimbal assembly 220 is attached to arm 230 is called a head arm assembly 221. Arm 230 moves slider 210 in transverse direction x with regard to the track of hard disk 262. One end of arm 230 is attached to base plate 224. Coil 231, which constitutes a part of a voice coil motor, is attached to the other end of arm 230. Bearing section 233 is provided in the intermediate portion of arm 230. Arm 230 is rotatably held by shaft 234 which is attached to bearing section 233. Arm 230 and the voice coil motor to drive arm 230 constitute an actuator.

Figure 11:
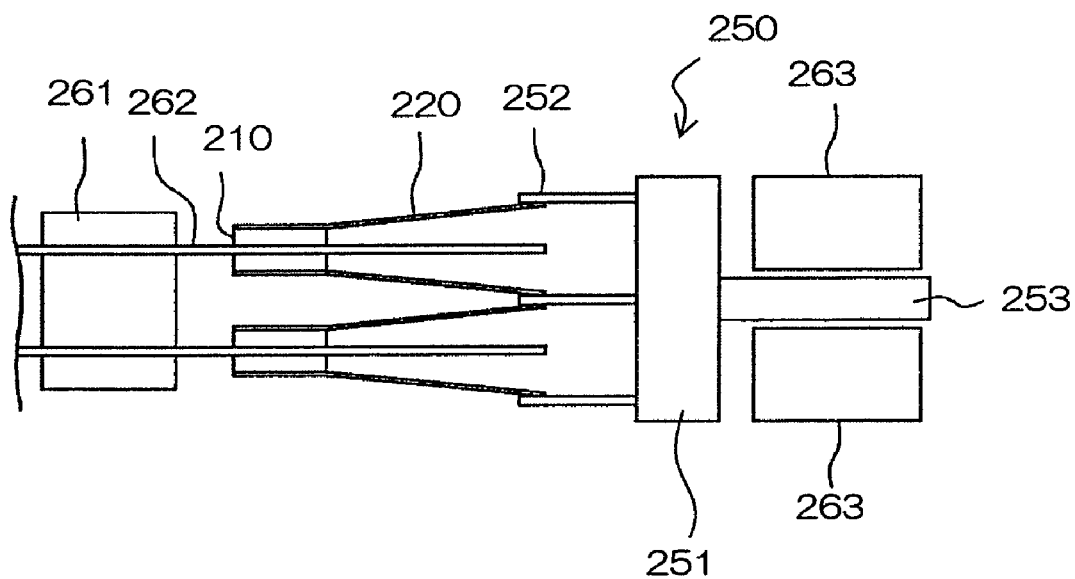
FIG. 11 is a side view of a head arm assembly which incorporates sliders of the present invention.
Figure 12:
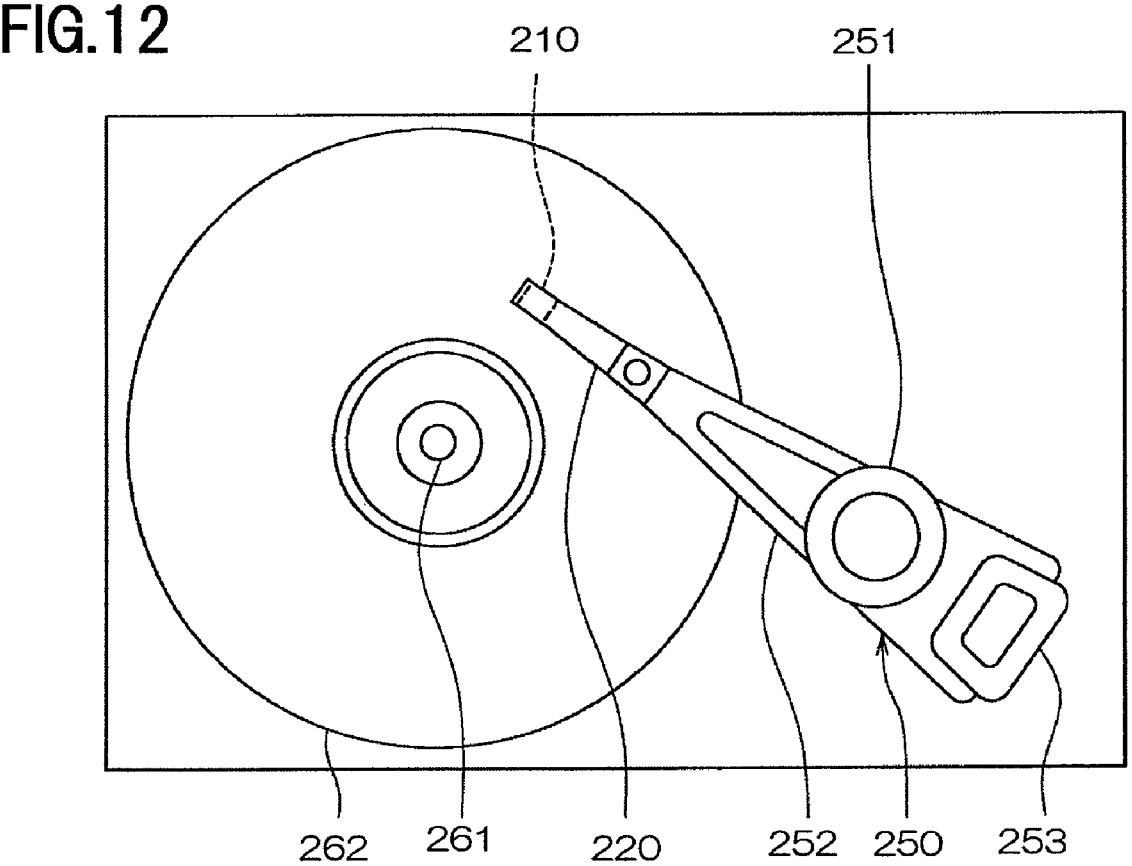
FIG. 12 is a plan view of a hard disk drive which incorporates sliders of the present invention.

Referring to FIG. 11 and FIG. 12, a head stack assembly and a hard disk drive that incorporate the slider mentioned above will be explained next. The arrangement in which head gimbal assemblies 220 are attached to the respective arm of a carriage having a plurality of arms is called a head stack assembly. FIG. 11 is a side view of a head stack assembly, and FIG. 12 is a plan view of a hard disk drive. Head stack assembly 250 has carriage 251 provided with a plurality of arms 252. Head gimbal assemblies 220 are attached to arms 252 such that head gimbal assemblies 220 are arranged apart from each other in the vertical direction. Coil 253, which constitutes a part of the voice coil motor, is attached to carriage 251 on the side opposite to arms 252. The voice coil motor has permanent magnets 263 which are arranged in positions that are opposite to each other and interpose coil 253 therebetween.

Referring to FIG. 12, head stack assembly 250 is installed in a hard disk drive. The hard disk drive has a plurality of hard disks which are connected to spindle motor 261. Two sliders 210 are provided per each hard disk 262 at positions which are opposite to each other and interpose hard disk 262 therebetween. Head stack assembly 250 and the actuator, except for sliders 210, work as a positioning device in the present invention. They carry sliders 210 and work to position sliders 210 relative to hard disks 262. Sliders 210 are moved by the actuator in the transverse direction with regard to the tracks of hard disks 262, and positioned relative to hard disks 262. Thin-film magnetic head 1 that is included in slider 210 writes information to hard disk 262 by means of the write head portion, and reads information recorded in hard disk 262 by means of the read head portion.

Although certain preferred embodiments of the present invention have been shown and described in detail, it should be understood that various changes and modifications may be made without departing from the spirit or scope of the appended claims.

What is claimed is:

1. A magnetic thin film comprising:
a pinned layer whose magnetization direction is fixed with respect to an external magnetic field;
a free layer whose magnetization direction is changed in accordance with the external magnetic field; and
a non-magnetic spacer layer that is sandwiched between said pinned layer and said free layer,
wherein sense current is configured to flow in a direction that is perpendicular to film surfaces of said pinned layer, said non-magnetic spacer layer, and said free layer, and
wherein said non-magnetic spacer layer has a first layer which includes $SnO_2$, and a pair of second layers which are provided to sandwich said first layer, said second layers being made of a material which exhibits a higher corrosion potential than Sn
wherein said first layer consists of $SnO_2$.

2. The magnetic thin film according to claim 1, wherein said first layer has a thickness of 1.1 to 1.9 nm.

3. The magnetic thin film according to claim 1, wherein said first layer has a thickness of 1.3 to 1.5 nm.

4. The magnetic thin film according to claim 1, wherein said second layer consists of Cu, and has a thickness of 0.3 to 2.5 nm.

5. The magnetic thin film according to claim 1, wherein said second layer consists of any one of Au, Ag, Pt, Pd, Ir, Ru, Rh, and Re.

6. A magnetic field detecting element comprising said magnetic thin film according to claim 1.

7. A magnetic thin film comprising:
a pinned layer whose magnetization direction is fixed with respect to an external magnetic field;
a free layer whose magnetization direction is changed in accordance with the external magnetic field; and
a non-magnetic spacer layer that is sandwiched between said pinned layer and said free layer,
wherein sense current is configured to flow in a direction that is perpendicular to film surfaces of said pinned layer, said non-magnetic spacer layer, and said free layer, and
wherein said non-magnetic spacer layer has a first layer which includes $SnO_7$, and a pair of second layers which are provided to sandwich said first layer, said second layers being made of a material which exhibits a higher corrosion potential than Sn
wherein said first layer consists of $SnO_2$ to which $Sn_2O_5$ is added.

8. The magnetic thin film according to claim 7, wherein an amount of Sb in said first layer that is added is more than 0 mol % and equal to or less than 20 mol %.

9. The magnetic thin film according to claim 7, wherein said first layer has a thickness of 1.5 to 2.6 nm.

10. The magnetic thin film according to claim 7, wherein said first layer has a thickness of 1.9 to 2.3 nm.

11. The magnetic thin film according to claim 7, wherein said second layer consists of Cu, and has a thickness of 0.3 to 2.0 nm.

12. The magnetic thin film according to claim 7, wherein said second layer consists of any one of Au, Ag, Pt, Pd, Ir, Ru, Rh, and Re.

13. A magnetic field detecting element comprising said magnetic thin film according to claim 7.

14. A magnetic thin film comprising:
a pinned layer whose magnetization direction is fixed with respect to an external magnetic field;
a free layer whose magnetization direction is changed in accordance with the external magnetic field; and
a non-magnetic spacer layer that is sandwiched between said pinned layer and said free layer,
wherein sense current is configured to flow in a direction that is perpendicular to film surfaces of said pinned layer, said non-magnetic spacer layer, and said free layer, and
wherein said non-magnetic spacer layer has a first layer which includes $SnO_2$, and a pair of second layers which are provided to sandwich said first layer, said second layers being made of a material which exhibits a higher corrosion potential than Sn
wherein said first layer consists of $SnO_2$ to which F is added.

15. The magnetic thin film according to claim 14, wherein said second layer consists of any one of Au, Ag, Pt, Pd, Ir, Ru, Rh, and Re.

16. A magnetic field detecting element comprising said magnetic thin film according to claim 14.

* * * * *

UNITED STATES PATENT AND TRADEMARK OFFICE
CERTIFICATE OF CORRECTION

PATENT NO.       : 7,859,798 B2
APPLICATION NO.  : 11/676969
DATED            : December 28, 2010
INVENTOR(S)      : Shinji Hara et al.

It is certified that error appears in the above-identified patent and that said Letters Patent is hereby corrected as shown below:

On Page 1, Item 57, Abstract, Line 6, Please change "said the" to --the--.

In Column 1, Line 62, Please change "CCP" to --CPP--.

In Column 5, Line 41 (approx.), Please change " $SnO_2 \rightarrow Sn_{Sn}{}^{*} + V_O{}^{*} e^{-} + O_2$ ," to -- $SnO_2 \rightarrow Sn_{Sn}{}^{*} + V_O{}^{*} + e^{-} + O_2$ --.

In Column 8, Line 16, Please change "$\Omega l/\mu m^2$)." to --$\Omega/\mu m^2$).--.

In Column 8, Line 19, Please change "$\Omega l/\mu m^2$)." to --$\Omega/\mu m^2$).--.

In Column 8, Line 20, Please change "$\Omega l/\mu m^2$)" to --$\Omega/\mu m^2$)--.

In Column 10, Line 26, Please change "when." to --when--.

In Column 12, Line 25, In Claim 7, Please change "$SnO_7$," to --$SnO_2$,--.

In Column 12, Line 29, In Claim 7, Please change "$Sn_2O_5$" to --$Sb_2O_5$--.

Signed and Sealed this
Twenty-first Day of February, 2012

David J. Kappos
*Director of the United States Patent and Trademark Office*